United States Patent [19]
Franklin et al.

[11] Patent Number: 5,113,285
[45] Date of Patent: May 12, 1992

[54] FULL COLOR THREE-DIMENSIONAL FLAT PANEL DISPLAY

[75] Inventors: Henry E. Franklin, Glendale, Ariz.; Ronald S. Gold, Fullerton, Calif.; Karen E. Jachimowicz, Goodyear, Ariz.; Harold J. Poley, Murrysville, Pa.; J. Robert Trimmier, Glendale, Ariz.

[73] Assignee: Honeywell Inc., Minneapolis, Minn.

[21] Appl. No.: 589,733

[22] Filed: Sep. 28, 1990

[51] Int. Cl.$^5$ .................. G02B 27/26; G02B 5/30
[52] U.S. Cl. .................. 359/465; 359/497; 359/500
[58] Field of Search ............ 350/132, 131, 130, 388, 350/391; 358/3, 88, 91, 92; 359/465, 497, 500

[56] References Cited

U.S. PATENT DOCUMENTS

| | | | |
|---|---|---|---|
| 2,301,254 | 11/1942 | Carnahan . | |
| 2,983,835 | 5/1961 | Frey, Jr. . | |
| 3,191,493 | 6/1965 | Maihardi et al. | 350/132 |
| 3,275,745 | 9/1966 | Var . | |
| 3,663,085 | 5/1972 | Davis | 350/132 |
| 3,829,838 | 8/1974 | Lewis et al. | 350/3.62 |
| 3,858,001 | 12/1974 | Bonne | 350/403 |
| 4,122,484 | 10/1978 | Tan | 358/88 |
| 4,431,265 | 2/1984 | Benton | 350/132 |
| 4,719,482 | 1/1988 | Hora | 358/91 |
| 4,792,850 | 12/1988 | Liptoh et al. . | |
| 4,877,307 | 10/1989 | Kalmanash | 350/132 |
| 4,879,603 | 11/1989 | Berman | 358/142 |

FOREIGN PATENT DOCUMENTS

| | | | |
|---|---|---|---|
| 1294452 | 5/1969 | France | 358/92 |
| 3214327 | 10/1983 | France | 350/132 |
| 274918 | 11/1988 | Japan | 350/132 |
| 274919 | 11/1988 | Japan | 350/132 |
| 274921 | 11/1988 | Japan | 350/132 |
| 54414 | 3/1989 | Japan | 350/132 |
| 1448520 | 9/1976 | United Kingdom | 350/132 |

OTHER PUBLICATIONS

Honeywell proprietary proposal to the U.S. Air Force, dated Aug., 1989.

*Primary Examiner*—Jon W. Henry

[57] ABSTRACT

A full color liquid crystal flat panel display having a step waveplate providing one-quarter and three-quarter wave phase retardation to alternating rows which provide left and right views. The result of right and left are circular polarized in opposite directions which two a viewer wearing circularly polarized glasses provides the left and right views to the appropriate eye such that the viewer is able to see full color three-dimensional images.

8 Claims, 7 Drawing Sheets

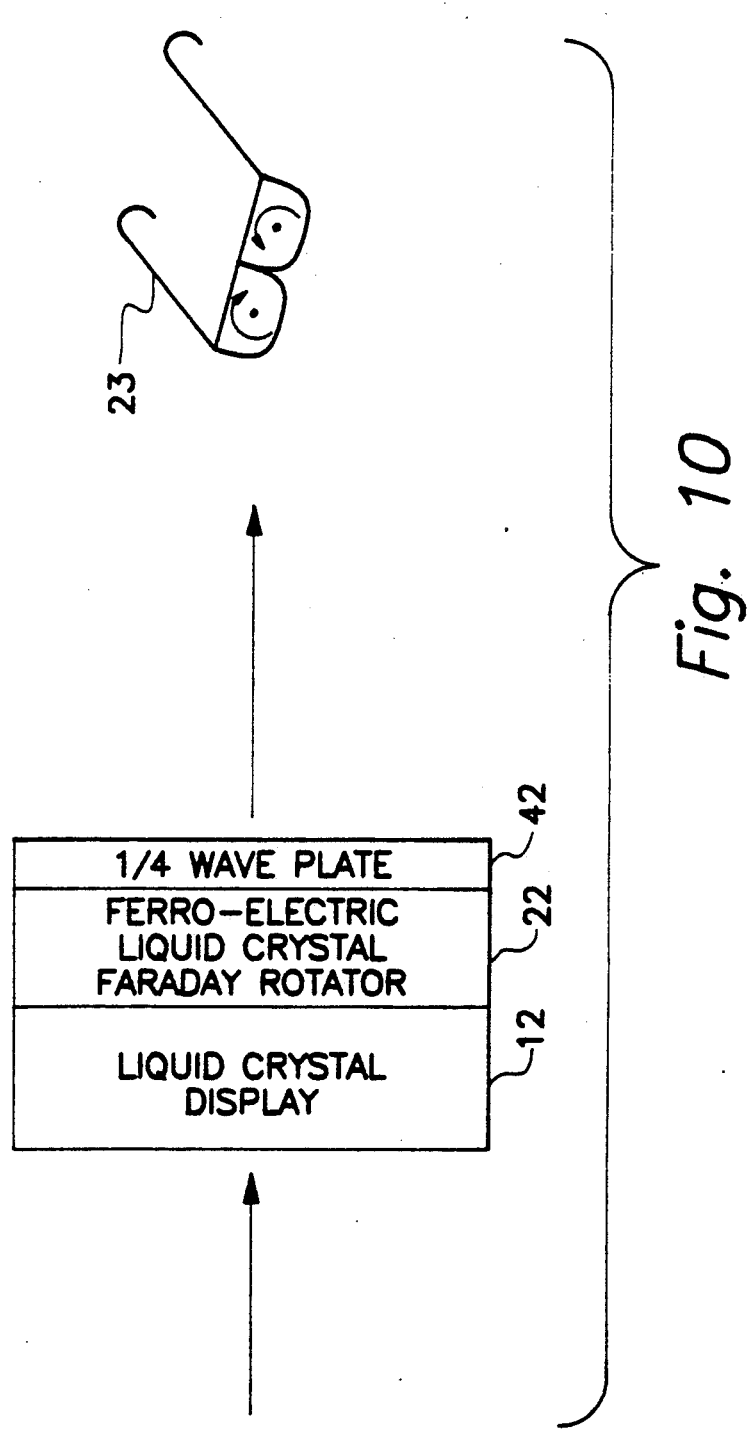

FULL COLOR THREE-DIMENSIONAL FLAT PANEL DISPLAY

Field of the Invention

The present invention pertains to full color three-dimensional displays. Particularly the invention pertains to flat panel displays utilizing retardation of light waves to obtain the three-dimensional aspects.

Background of the Invention

Flat panel displays, including three-dimensional color displays, have been in the related art. The placement of linear polarizing strips has been placed on TV screen with an intent to effect a three-dimensional image. One enormous difficulty of the this approach has been the fabrication or manufacturing of such linear polarization strips which are to be placed on a TV screen.

Summary of the Invention

The present invention involves a full color three-dimensional liquid crystal display having alternating rows of fixed retardation varying phases by one-half wave. By specially alternating views on correspondingly alternating rows or columns, and passing the light through a retarder to alternate phase retardation, the views are circularly polarized in opposite directions or otherwise have discriminantly affected polarization and a quarter waveplate for the respective circular polarizations. Thus a viewer with circularly polarized glasses has the respective view presented to the appropriate eye in thus the viewer perceives a three-dimensional full color view.

Brief Description of the Drawings

FIG. 10 indicates the arrangement for a display incorporating a Faraday rotator.

Description of the Preferred Embodiments

One embodiment incorporates a full color active matrix liquid crystal flat panel display and a separate liquid crystal cell, capable of providing alternating lines of fixed retardation varying in phase by one-half wave. The retardation cell is aligned and superimposed over the image forming flat panel display.

Figure 1:
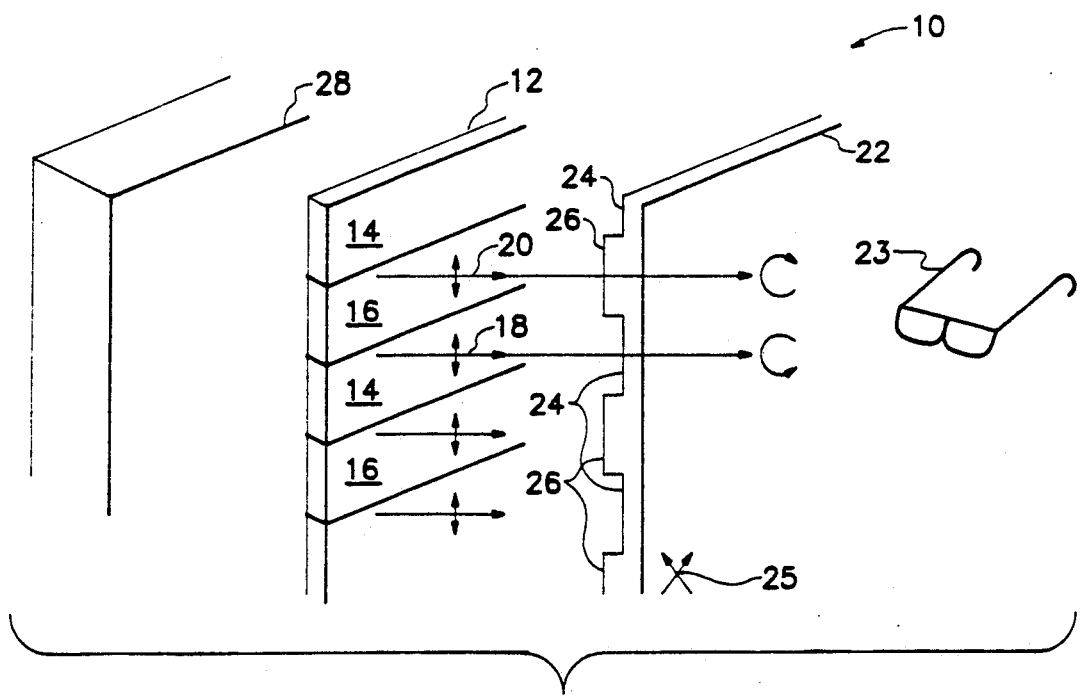
FIG. 1 reveals one embodiment of the invention.

In FIG. 1, display 10 incorporates step retardation. Light 18 and 20 exiting flat panel display 12 is normally plane polarized (i.e., the polarization vector is in one specific direction). Alternating lines 14 and 16 present two different views of a scene or image for the right eye and the left eye, respectively. The alternating (specially) right eye/left eye views on corresponding lines 14 and 16 may be columns or rows of panel 12. The light from these alternating lines 14 and 16 pass through retarder 22 which alternates in the form of etched steps 24 and 26 to match the alternating display lines 14 and 16, between one-quarter wave and three-quarter wave phase retardation. The light of lines 14 represents one view which passes through the quarter wave retarder lines or notches 24 of waveplate 22 resulting in light that is circularly polarized in the right hand direction. The light from lines 16 represents another view and passes through the three-quarter wave retarder lines or humps 26 of waveplate 22 resulting in circularly polarized light in the left hand direction. For basics, linearly polarized light in the S orientation transmitted through a one quarter wave plate becomes right circularly polarized and through the three quarter wave plate becomes left circularly polarized. Linearly polarized light in the P orientation transmitted through a one quarter wave plate becomes left circularly polarized. Thus, with the two views representing th right and left images of the stereo presentation, a viewer wearing correspondingly circularly polarized glasses or visor 23, a correct view to the respective eye of the stereo image is presented thereby resulting in a three-dimensional perception by the viewer.

Display 10 may use either alternating rows or columns to perform the function of providing dual images (stereo pairs), although alternating rows is preferred. It is the horizontal direction that provides disparity and stereo queues and therefore desirable to have high addressability in the horizontal direction. The need for high addressability in a horizontal direction outweighs the minimal vertical offset caused by the alternating rows. The vertical offset presented by alternating rows is adequate and usable.

Optical retarder 22 may be made of some transparent anisotropic material such as mica, quartz and potassium dihydrogen phosphate (KDP), as well as liquid crystals. Typical optical retarders have two orthogonal axes 25 (in FIG. 1) within the anistropic material. These axes are called the ordinary and extraordinary directions (axes), or fast and slow axes, within the crystal. The component of light in the ordinary direction will travel with one phase velocity while the component in the extraordinary directions will have a different phase velocity. One component will have its phase retarded with respect to the other, causing a rotation in the plane of polarization, or a change of state of the emerging light. The phase difference is proportional to the path length of light in the medium and is given by the equation which is $\Delta = 2\pi(n_e - n_o)T/\lambda$ where $\Delta$ is the phase difference, T is the thickness of the medium, and $n_o$ and $n_e$ are the indices of refraction along the ordinary and extraordinary axes, respectively.

Interest here is in the effect on the polarization state where there is one-quarter wave and three-quarter wave retardation. A quarter wave plate produces a phase retardation of $\Delta = \pi/2$. The thickness of such a plate is therefore $T = \lambda/4(n_e - n_o)$. A three-quarter wave plate produces a phase retardation of $\Delta = 3\pi/2$ and the thickness thus is equal to $T = 3\lambda/4(n_e - n_o)$. Display 10 permits one to utilize a standard flat panel display to produce three-dimensional imagery, retaining the characteristic power, weight, volume, and color capabilities of the flat panel.

Two-dimensional imagery is also possible. Resolution is twice improved over three-dimensional imagery. Two-dimensional imagery is displayed on the panel by electronically eliminating disparity. The display is visible with or without the polarization glasses and is not degraded by the retarder placed over the display. Circular polarization, as a result of retarder 22 permits head tilt without glossive image intensity.

Retarder 22, composed of liquid crystal, appears to provide the best overall performance characteristics. Nematic liquid crystals are anistropic materials which can be oriented to form a birefringent layer. Liquid crystals aligned between suitably prepared substrates can be used as large aperture retardation plates. Furthermore, the retardance of these cells can be tuned by applying an appropriate electric field. This capability makes a liquid crystal cell ideally suited for use with the three-dimensional flat panel color display. Liquid crystal retarders are superior to retarders made from natural crystals in several respects. For most natural crystals, mechanical considerations generally necessitate the construction of multiple order waveplates with limited fields of view. Although zero order waveplates can be constructed, they are expensive and difficult to fabricate. Transmission losses can be significant and large aperture waveplates can be very expensive or impossible to fabricate. There is sufficient variability in birefringence of liquid crystals to provide a wide retardation range. Transmission is typically greater than 95% and large aperture devices can be made. relatively easy and expensively.

Figure 2A:
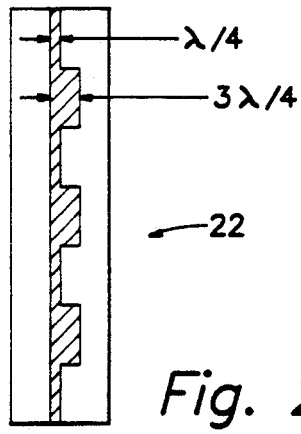
FIGS. 2a and 2b illustrate liquid crystal and mica crystal retarders, respectively.
Figure 2B:
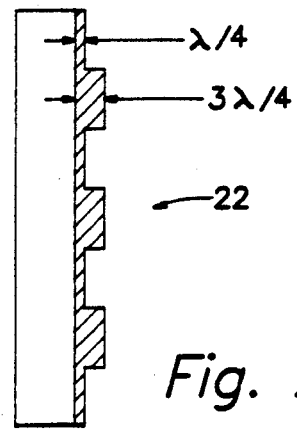

Another material, mica, may be used in construction of retarder 22 in FIG. 2b. Mica is a natural crystal that can be used in very thin pieces. Effective quarter wave, three-quarter wave steps may be etched in the mica to appropriate thicknesses. Such mica is bonded to the front of a display panel. A limitation to using mica is that optical quality mica sheets are not available in very large sizes, for instance, typically no larger than approximately nine square inches. To cover a twenty-five square inch area, several pieces of mica would have to be piled together. This approach presents fabrication difficulties in lining up the component axes with respect to each other yet the use of mica retarder for three-dimensional flat panel color display 10 is at least a back-up approach. By etching or milling mica or some other material, a step retarder can also be form. These retarders can be first order or multiorder in form. A cover glass or durable coating can be applied over the mica or other materials for protection.

One form of construction of the liquid crystal step retarder is depositing a striped pattern with transparent electrodes (e.g., ITO). The cell is designed through control of its thickness, to have a nominal retardation of $\frac{3}{4}\lambda$, when voltage is applied. The areas defined by striped electrodes result in a retardation of $\lambda/4$. Another approach is for the fixed liquid crystal step retarder wherein the liquid crystal material is situated such that the physical thickness alternates between rows lambda/four and three/four lambda retardation as noted in figure 2a.

Figure 3:
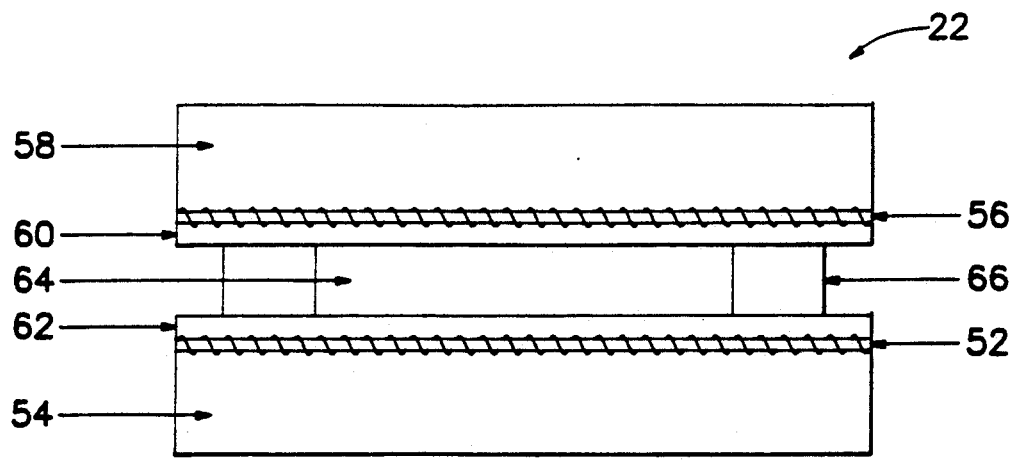
FIG. 3 shows the structure of a basic liquid crystal retarder.
Figure 4:
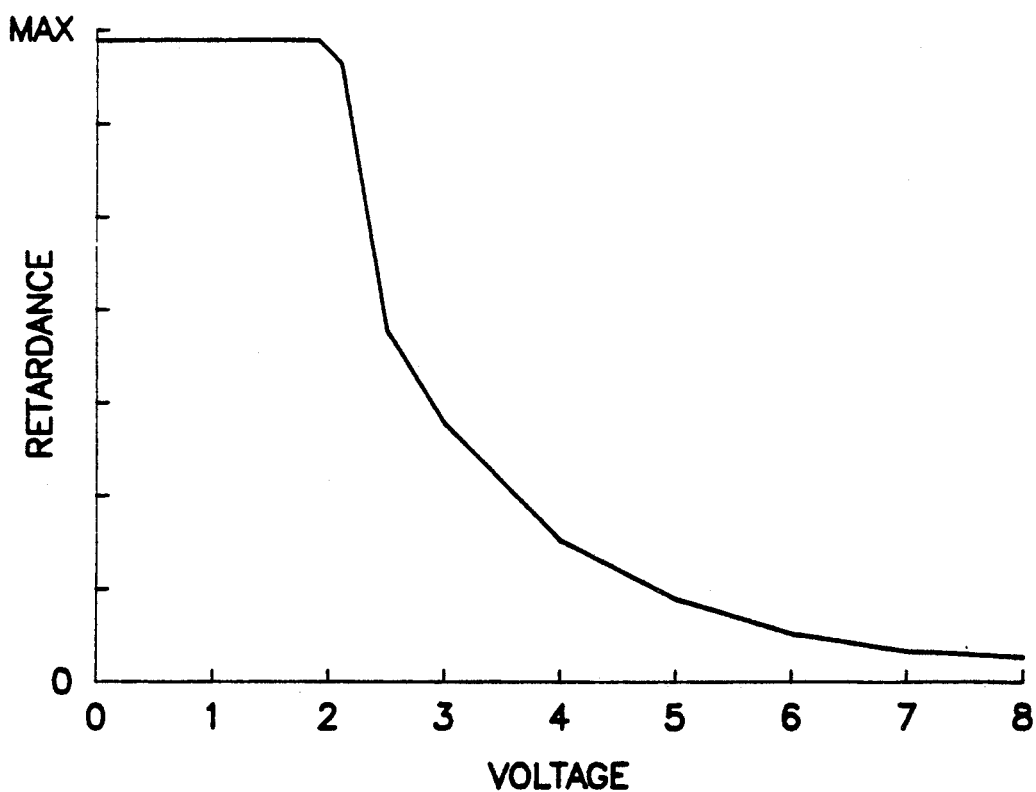
FIG. 4 is a graph of retandance versus voltage for a liquid crystal retarder cell.

The preferred embodiment is an attached liquid crystal retarder cell 22 to the front of flat panel 12. Sizes up to 12×12 inches can easily be accommodated. Liquid crystal retarder 22 possess high retardance uniformity. FIG. 3 reveals the construction of a basic crystal retarder 22. Retarder 22 is constructed in a sandwich fashion. Transparent electrode (ITO) 52 is a layer on substrate 54. A layer of polyimide 62 is on ITO 52. Similarly, ITO 56 is a layer on substrate 58. A layer of polyimide 60 is on ITO 56. Between layers 60 and 62 is liquid crystal 64 and spacers 66 which maintain a particular distance between parallel layers 60 and 62. The maximum retardance of a tunable liquid crystal retarder 22 occurs at zero voltage and is determined by the thickness of the cell and the refractive indices of the liquid crystal, just as in the determination with solid crystal retarders. A voltage applied to the cell decreases the amount of retardation introduced until a saturation voltage zero retardance is obtained. FIG. 4 shows the retardance versus voltage for the typical liquid crystal retarder cell. Thus, the orientation of the liquid crystal axis is continuously adjustable with variation of the voltage applied across the front. The effective birefringence ($n_e - n_o$), and thus retardation, as seen by light normally incident to the cell is continuously variable within the boundary limits. The present embodiment uses a cell designed to have a retardation difference of one-half wave between the "off on" state of the cell. Ideally, this cell will have one-half wave retardation at zero volts and zero retardation at any voltage greater than the saturation voltage. Additional quarter wave retardation may be supplied either by liquid crystal retarder or a separate solid retarder. The result is two available states of retardation —one-quarter wave and three-quarter wave.

Figure 5:
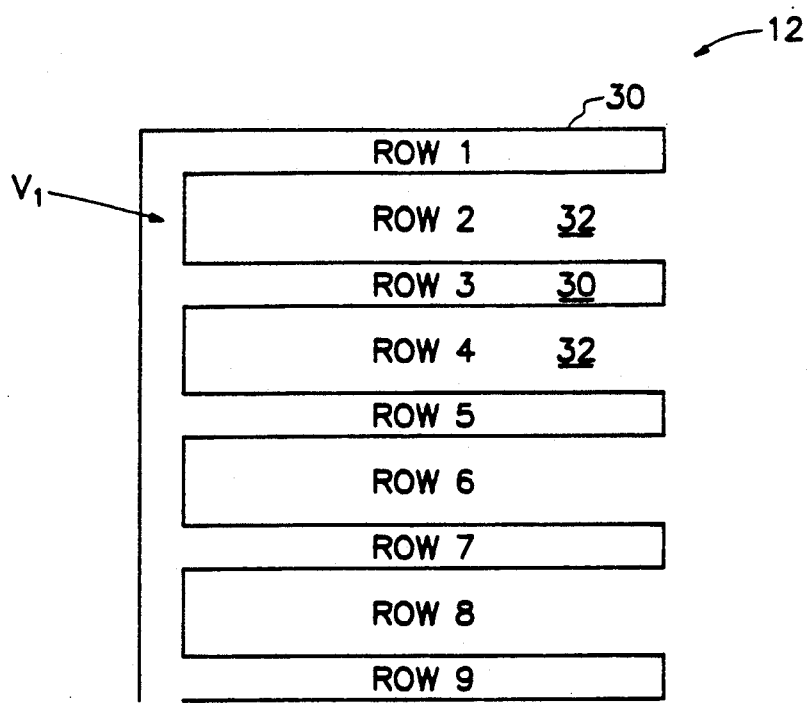
FIGS. 5 and 6 reveal two configurations for alternating row retardance.

FIG. 5 illustrates one way of achieving retardance of appropriate rows 14 and 16 of panel 12. A set of electrodes 30 are superimposed over alternate rows of flat panel 12. The thickness of the cell of panel 12 is set for three-quarter wave retardation at zero volts. Electrodes 30 over alternating rows drives these rows with voltage sufficient to provide overall one-quarter wave retardation. Rows 32 without electrodes retain their original three-quarter wave retardation.

Figure 6:
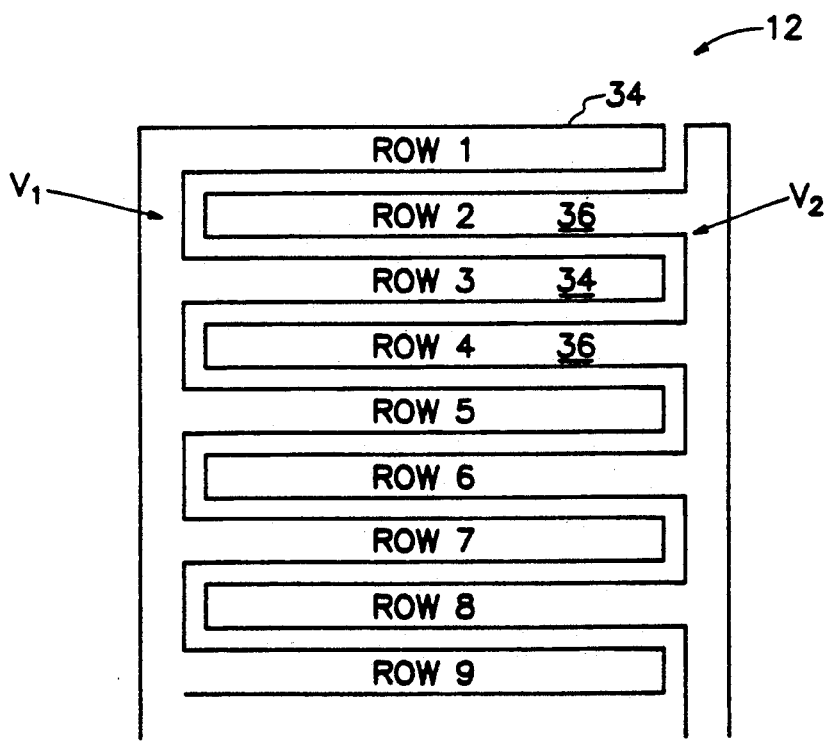

An alternate approach, shown in FIG. 6, has electrodes over each of the rows of panel 12. Interleaved indium tin oxide (ITO) electrodes 34 and 36 are placed over the rows of panel 12, allowing one voltage to be applied to all odd rows 34 and another voltage applied to even rows 36. The "on" and "off" voltages applied to alternate rows 34 and 36, respectively, supply quarter wave and three-quarter wave retardance values.

Figure 7:
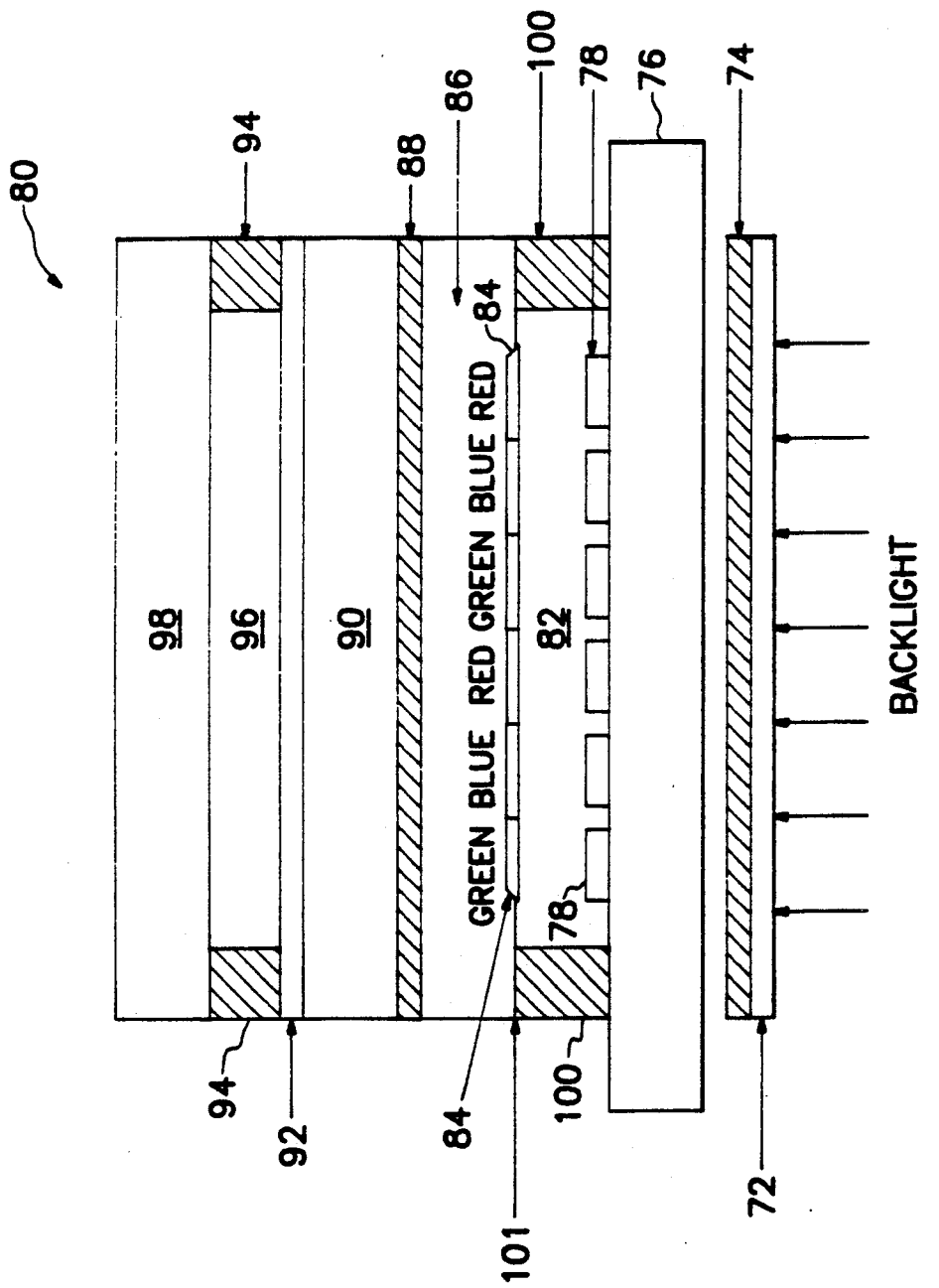
FIG. 7 illustrates a color liquid crystal display flat panel incorporating a liquid crystal retarder.

Parallax effects due to the difference between line retarder 22 and the act of media in panel 12 are minimized with a fiber optic substrate on the viewing side of liquid crystal display flat panel and a fiber optic substrate o the side of the liquid crystal retarder which mates to flat panel 12. As illustrated in FIG. 7, these fiber optic substrates transfer the image from the image forming plane retarder 22 With respect to conservation of the polarization state, test on fiber optic substrates have revealed for the given thickness, the linearly polarized light exiting display 10 is not effected.

FIG. 7 shows section 80 for color display 10. Backlight of display 10 enters through diffuser 72 and polarizer 74, respectively. Then the light goes through lower substrate 76 which is a tin film transistor array having pixel electrodes 78 mounted on the array. Light then goes through layer 82 of liquid crystal material. Layer or fiber optic substrate 86 is supported on lower substrate 76 by spacers 100 which provide space for liquid crystal material 82. Color filters 84 are at the base of substrate 86 with common electrode 10!. After coming through substrate 86, light goes through a polarizer layer 88, fiber optic substrate 90, ITO rows 92, liquid crystal retarder 96 and top substrate 98, in that order. Spacers 94 maintain space between layers 92 and 98 for liquid crystal material of retarder 96.

Figure 8A:
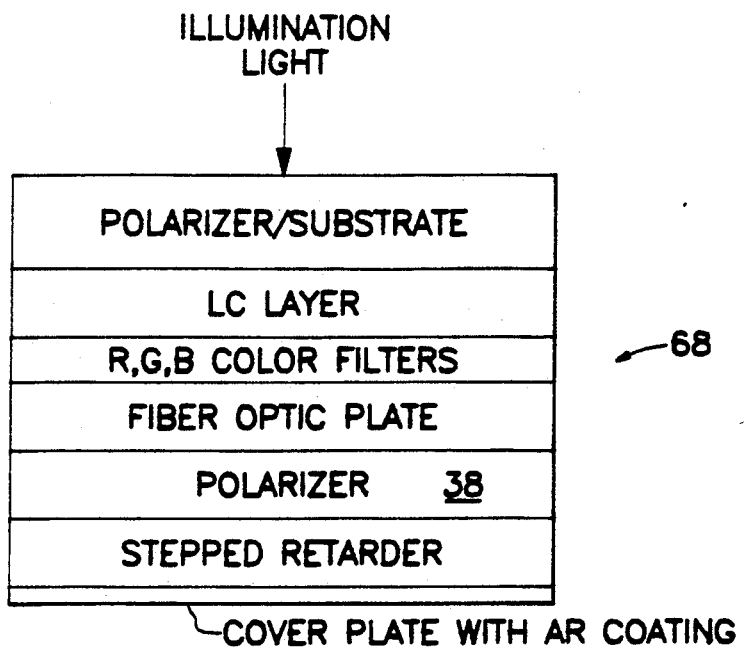
FIG. 8a shows the stack arrangement for a flat panel display incorporating a twisted nematic liquid crystal material.
Figure 8B:
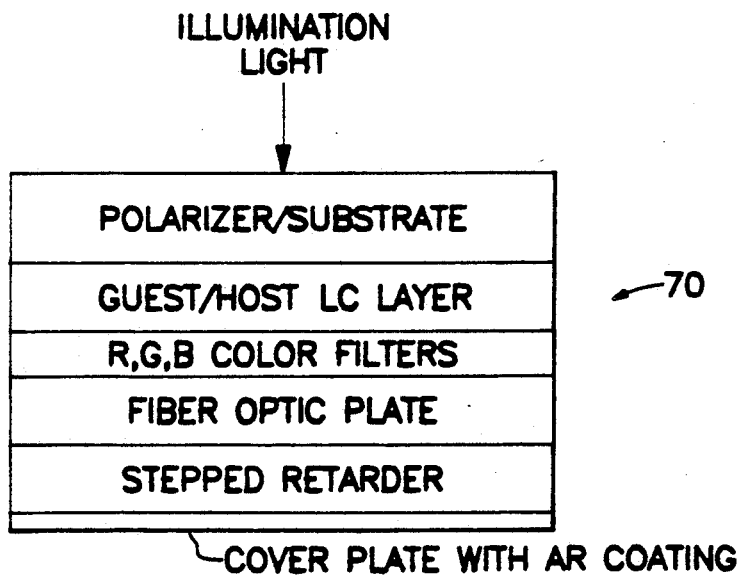
FIG. 8b shows the stack arrangement for a flat panel display incorporating a guest/host liquid crystal material.

Alternatively, incorporating a twisted nematic liquid crystal material in flat panel display 10 requires an outer polarizer 38 between fiber optic substrates in display section 68 (FIG. 8a). Tests have shown that polarizers of less than 6 thickness neither restrict the viewing zone or cause any significant image degradation. Outer polarizer 38 is not required if a guest/host liquid crystal material is used in display section 70 for flat panel display 10 of FIG. 8b.

Figure 9:
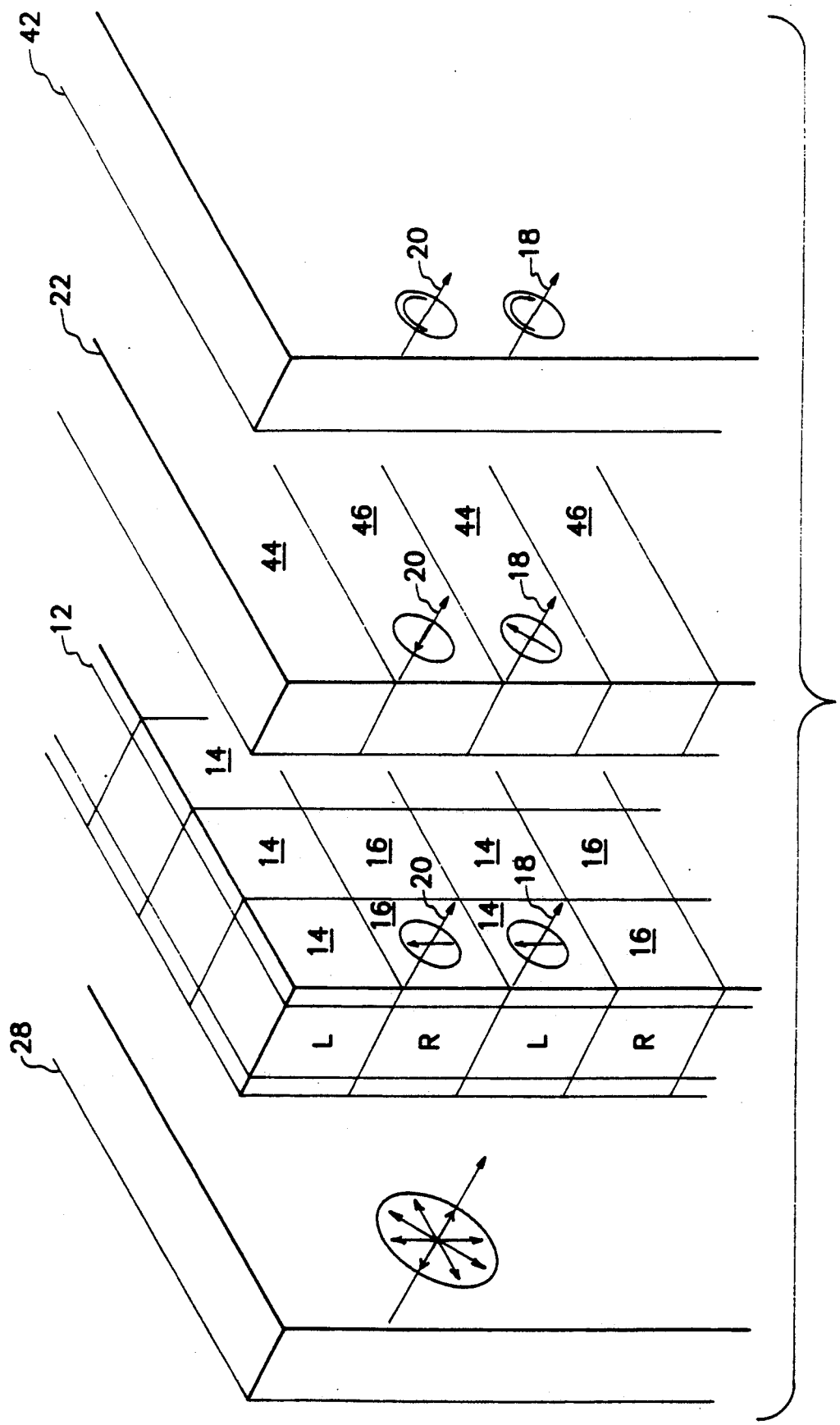
FIG. 9 reveals another embodiment of the invention.

Retarder 22 may be a ferro-electric liquid crystal Faraday rotator as shown in FIGS. 9 and 10. The light exiting display panel 12 is plane polarized. The plane polarized light then enters retarder 22 or ferro-electric liquid crystal Faraday rotator (FELCFR). Retarder 22 is patterned so that its electrodes match the pitch of the liquid displays rows. Unlike liquid crystal display 12, the FELCFR consists of only row electrodes and is thus not a matrix. Rows 44 and 46 are addressed with signals of opposite voltage polarity s that the position of the north and south magnetic poles of the ferro-electric (FE) material reverse every row. Consequently, the plane polarized light exiting liquid crystal display 12 will be Faraday rotated when it passes through FELCFR 22. The direction of rotation will depend on magnetic polarity of the FE material. The degree of rotation is fixed by the cell thickness and the type of FE liquid crystal material. These will be chosen to impart a 45° clockwise (LH) and counterclockwise (RH) rotation. The result is that the light information exiting adjacent rows of the FELCFR will have a 90° difference between their polarization axes. This light is then passed through an appropriately oriented ¼-wave plate 42 to create left-circularly and right-circularly polarized light, respectively, for left and right images. With the viewer wearing circularly polarized glasses 23, the correct view for the left and right eye images are presented to the appropriate eyes.

We claim:

1. A full color, three-dimensional flat panel display comprising:
    means for displaying a first image having a first polarization;
    means for displaying a second image having a first polarization;
    means for changing the first polarization of the first image to a second polarization; and
    means for changing the first polarization of the second image to a third polarization; and
    wherein:
        the first polarization is linear;
        the second polarization is circular having a first direction;
        the third polarization is circular having a second direction;
        said means for displaying a first image ia first plurality of display lines;
        said means for displaying a second image is a second plurality of display lines; and
        said first plurality of display lines is interlaced with said second plurality of display lines.

2. Apparatus of claim 1 wherein each of said first plurality of display lines alternates with each of said second plurality of display lines, on said display.

3. Apparatus of claim 2 wherein said means for changing the first polarization of the first image to a second polarization and said means for changing the first polarization of the second image to a third polarization are a wave retarder proximate to said display, having a structure that applies one-quarter-wave retardation and three-quarter-wave retardation to said first plurality of display lines and to said second plurality of display lines, respectively.

4. Apparatus of claim 3 wherein said wave retarder is a waveplate having one-quarter wave and three-quarter wave steps etched in said waveplate in the form of lines that overlap the first and second pluralities of display lines, respectively.

5. Apparatus of claim 2 wherein said means for changing the first polarization of the first image to a second polarization and said means for changing the first polarization of the second image to a third polarization are a wave retarder proximate to said display, having a structure that imparts a clockwise rotation to the first polarization and a counterclockwise rotation to the second polarization of said first plurality of display lines and of said second plurality of display lines, respectively.

6. Apparatus of claim 5 wherein said wave retarder is a ferro-electric liquid crystal faraday rotator.

7. Apparatus of claim 2 wherein said flat panel display provides three-dimensional images to a viewer at a given level of resolution and provides two-dimensional images to the viewer at twice the given level of resolution, when the first and second images are the same.

8. A full color, three-dimensional flat panel display comprising:
    a first plurality of display lines for emitting light of a first image, having a first polarization;
    a second plurality of display lines for emitting light of a second image, having a first polarization; and
    an optical retarder, fixed on said display, for converting the light of the first image to a second polarization and the light of the second image to a thrid polarization, having areas of a fist thickness situated proximate to the first plurality of display lines and having areas of a second thickness situated proximate to the second plurality of display lines; and
    wherein he first an second images are capable of providing a three-dimensional image.

* * * * *

UNITED STATES PATENT AND TRADEMARK OFFICE
CERTIFICATE OF CORRECTION

PATENT NO. : 5,113,285

DATED : May 12, 1992

INVENTOR(S) : H.E. FRANKLIN, R.S. GOLD, K.E. JACHIMOWICZ, H.J. POLEY, J.R. TRIMMIER

It is certified that error appears in the above-identified patent and that said Letters Patent is hereby corrected as shown below:

Column 6, line 50, delete "fist" and insert --first--
Column 6, line 55, delete "he first an" and insert --the first and--

Signed and Sealed this

Tenth Day of August, 1993

Attest:

MICHAEL K. KIRK

Attesting Officer

Acting Commissioner of Patents and Trademarks